May 2, 1939. S. COHEN 2,156,449
VARIABLE CONDENSER
Filed June 13, 1935
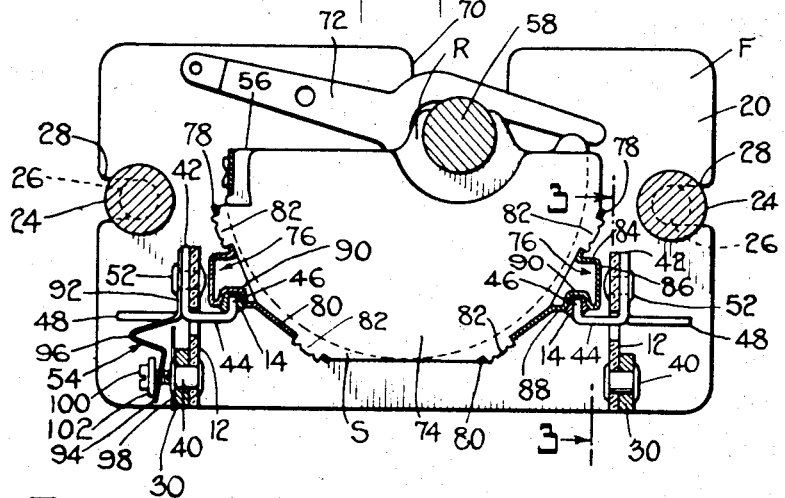
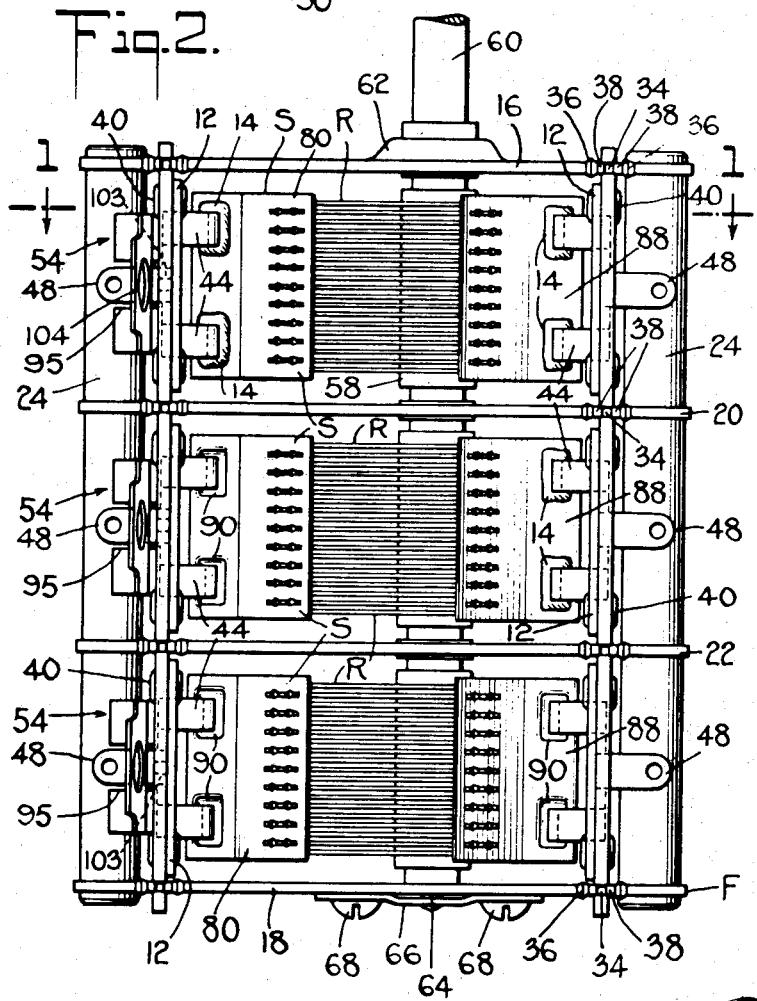
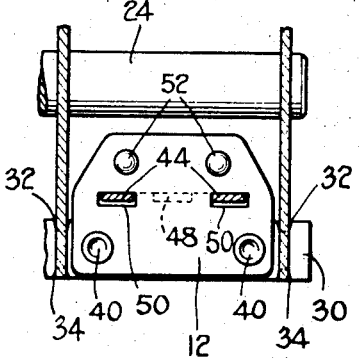
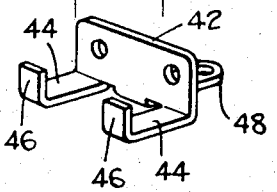
INVENTOR
Samuel Cohen
BY
*James F. Franklin*
ATTORNEYS Patented May 2, 1939

2,156,449

UNITED STATES PATENT OFFICE 2,156,449

VARIABLE CONDENSER

Samuel Cohen, Brooklyn, N. Y.

Application June 13, 1935, Serial No. 26,379

5 Claims. (Cl. 175—41.5)

This invention relates to electrical condensers, and more particularly to variable condensers.

In my co-pending application, Serial No. 26,378 filed June 13, 1935, I have disclosed an improved variable condenser in which the stator is secured to the frame of the condenser by soldering together adjacent metallic parts while holding the stator in exact desired position relative to the rotor. This construction avoids strain and deformation of the stator such as arises when the stator is secured in place by tightening appropriate mounting screws or the like. The primary object of the present invention is to generally improve condensers having soldered stator supports as aforesaid.

A more particular object of my invention resides in the provision of a condenser in which all of the soldered points for supporting the stators are simultaneously accessible through one side of the condenser or in one direction. With this arrangement the condenser may be suitably disposed to facilitate the application of solder from above and all of the points to be soldered may be treated simultaneously. Still another object is to so relate the adjacent metal parts of the support system which are to be soldered that the stator is universally movable relative to the frame for proper adjustment prior to the soldering operation. In accordance with still another feature and object of my invention, the parts to be soldered include solder receiving pockets near the bottom of the condenser, which pockets all face upwardly when the condenser is inverted and which not only facilitate the soldering operation but confine the solder, reduce the amount of solder necessary, and increase the strength of the resulting connection. Other objects of my invention center about the frame of the condenser and are to provide a frame which will be fully open at the bottom, thereby facilitating the soldering of the stators; which will be sturdy and rigid, despite the absence of a bottom wall; and which will include appropriate provision for compensator or trimmer condensers.

To the accomplishment of the foregoing and other objects which will hereinafter appear, my invention consists in the variable condenser elements and their relation one to the other as are hereinafter more particularly described in the specification and sought to be defined in the claims. The specification is accompanied by a drawing in which:

Fig. 1 is a transverse section through the condenser taken in the plane of the line 1—1 of Fig. 2;

Fig. 2 is an inverted plan view of the condenser;

Fig. 3 is a fragmentary section taken in elevation in the plane of the line 3—3 of Fig. 1; and Fig. 4 shows one of the stator support members with integrally formed circuit connection lug.

Referring to the drawing, the condenser comprises a frame F, a plurality of rotors R oscillatably mounted therein, and a plurality of stators S fixedly mounted therein. The stators are secured within the frame by a support system which is partially metallic and partially insulation, in order to insulatedly support the stators. The insulation pieces forming a part of the support system are indicated at 12. The metallic parts of the support system include parts brought close together and secured by solder, as is indicated at the points 14. It will be noted from examination of the drawing that the soldered pieces 14 all face in one direction, specifically the bottom of the condenser; and that the bottom of the condenser is entirely open, thereby fully and simultaneously exposing all of the points to be soldered. By inverting the condenser during the soldering operation, the solder may be conveniently applied from above. The inverted position of the condenser is any way convenient because of the nature of the jig or fixture employed for properly spacing and relatively locating the stator and rotor plates preliminary to and during the soldering operation.

Considering the condenser in greater detail, the frame F comprises end plates 16 and 18 and partition plates 20 and 22, all arranged in spaced parallel relation and rigidly secured together by sturdy spacer bars 24. In the present case these bars are solid and cylindrical and are grooved as indicated at 26 to receive notches or slots 28 cut into the side edges of the end and partition plates. These parts are fitted together with a force-fit and require no additional means to secure the same together.

The end and partition plates are further interlocked by upright strips 30 which are set into mating or receptive slots cut upwardly from the bottom edges of the end and partition plates. The top edge of strip 30 is itself slightly recessed or notched as is best shown at 32 in Fig. 3, thereby establishing the desired location or spacing of the end and partition plates. The bottom edge of strip 30 is also preferably indented or upwardly notched, as is indicated at 34, and the bottom edges of the end and partition plates are staked at 36, (Fig. 2) thereby jamming some of the metal into recess 34 as is shown at 38. This construction locks the strips 30 in place.

The insulation pieces 12 heretofore referred to are preferably shaped as shown in Fig. 3, but of course may be shaped in a variety of ways. These pieces are riveted to strips 30 by appropriate rivets 40. They in turn carry stator support members 42 best shown in Fig. 4 of the drawing. These support members have horizontal support fingers 44 formed integrally therewith and the tips 46 of fingers 44 are preferably turned upwardly. Some of the waste metal between fingers 44 may be appropriately shaped and struck in opposite directions to form the circuit connection lug 48. The insulation pieces 12 are slotted at 50 to receive support fingers 44 and the complete support 42 is rigidly locked in place by appropriate rivets 52. It will be noted that the body of support 42 is located outside the insulation piece 12 and this is of advantage, first, in providing access to circuit connection lug 48 and secondly, and more importantly, in providing an excellent connection for the adjustable plate 54 of a suitable trimmer or compensator condenser.

The rotors R need no detailed description, being conventional in construction and each comprising a plurality of plates 56 held in spaced parallel relation on a suitable rigid rotor shaft 58, one end 60 of which projects through the forward end plate 16 of the frame. The rotor shaft 58 is suitably journaled in the frame as by the use of a series or raceway of ball bearings at 62 in forward end plate 16, and a single thrust ball bearing at 64, this bearing being supported by an adjustable plate 66 held on rotor end plate 18 by screws 68. The partition plates 20 and 22 are downwardly notched or cut away as shown at 70 in Fig. 1, thereby clearing the rotor shaft. Contact between the rotor and frame and circuit connections to the rotor sections may be made by means of conventional forked contact springs 72, one of which is shown in Fig. 1. These springs have been omitted in Fig. 2 in order not to unnecessarily complicate the drawing, but it will be understood that one spring may be and preferably is used for each condenser section.

The stators S each comprise a plurality of stator plates 74 which are held assembled in spaced parallel relation by appropriate spacer straps or combs generally designated by the numeral 76. Each spacer 76 includes an upper strap 78 and a lower strap 80 secured to the stator plates by appropriate staked tongue and slot connections 82. The straps 78 and 80 are preferably disposed at an angle and spaced about the periphery of the stator plates and are interconnected by outwardly pressed channels including a top wall 84, a side wall 86 and a bottom wall 88. The bottom wall 88 is preferably horizontally disposed and is desirably indented at 90 to form solder pockets located directly above the tips 46 of the support fingers 44. In fact, the upwardly turned tips 46 preferably project into solder pockets 90, as is clearly shown in Fig. 1, but there is preferably no direct contact therebetween which might interfere with universal movement or adjustability of the stator prior to the soldering operation.

In practice the rotor shaft is secured in place and properly adjusted before the stators are soldered. The condenser is then placed in a suitable jig or fixture which operates to accurately center and space the stators relative to the rotors. The condenser is preferably in inverted position. While the stators are thus accurately positioned in desired location, solder is applied to the solder pockets 90 and heated, thereby forming the soldered connections 14 previously referred to. In Fig. 2 some of the connections are shown soldered and others have been left open. This showing is made solely for purposes of illustration and it will be understood that in actual practice all of the soldered connections 14 are preferably formed at one and the same time. To avoid the pressure of soldering irons or the like on the parts of the condenser, the soldered joints may be formed by directing a plurality of properly spaced jets of flame against the soldering pockets after preliminarily placing a small piece or measure of solder at each pocket. The flames melt the bits of solder all at one time, thereby forming all of the soldered connections simultaneously. With this treatment, the use of the solder pockets 90 is especially convenient, for it automatically localizes the applied solder and keeps it from running to other parts of the condenser where it is not desired and might even prove injurious. Of course the pockets are also of value in strengthening the soldered connections, in providing a maximum of soldered surface with a minimum of solder, and in affording universal adjustment of the stator relative to the frame during the soldering operation.

The condenser may be provided with appropriate compensator or trimmer condensers and these are formed by the provision of a stamped sheet metal plate 54, the upper end 92 of which is riveted to the stator support 42 and insulation piece 12 by the same rivets 52 as are used even when no trimmer is employed. The lower end 94 of the trimmer plate acts as a condenser surface and is connected to the upper end 92 by an outwardly bent portion 96 which adds flexibility to the plate. A suitable piece of insulation, preferably a mica strip 98, is placed between the trimmer plate 94 and the frame strip 30 of the condenser. The trimmer plate is adjusted by an appropriate screw 100 bearing against the insulation washer 102 and passing through a large hole 104 in the plate. The screw is threadedly received in a threaded hole 103 in strip 30. The outwardly bent portion 96 of the trimmer plate 54 is slotted or cut away at 95 to clear the outwardly projecting circuit connection lug 48.

It is believed that the mode of constructing and assembling as well as the many advantages of my improved variable condenser with soldered stator support will be apparent from the foregoing detailed description thereof. It will also be apparent that while I have shown and described my invention in a preferred form, many changes and modifications may be made in the structure disclosed without departing from the spirit of the invention defined in the following claims.

I claim:

1. A variable condenser comprising a frame, a rotor mounted therein, a stator including stator plates and outwardly channeled spacer straps holding the same in spaced parallel relation, a wall of said channels being indented upwardly to form solder pockets, metallic stator supporting fingers insulatedly mounted on said condenser frame and projecting inwardly to points beneath the solder pockets and there turned upwardly into said solder pockets, the union between the supporting fingers and the spacer straps being made by solder received in said solder pockets, thereby providing a strain free stator mounting.

2. A variable condenser comprising a frame, a rotor mounted therein, a stator including stator plates and outwardly channeled spacer straps holding the same in spaced parallel relation, the bottom wall of said channels being substantially horizontal and being indented upwardly to form solder pockets, metallic stator supporting fingers insulatedly mounted on said condenser frame and projecting inwardly to points beneath the solder pockets, the bottom of the condenser frame being open to accessibly expose all of said solder pockets, the union between the supporting fingers and the spacer straps being made by solder received in said solder pockets, thereby providing a strain free stator mounting.

3. A variable condenser comprising a frame including end and partition plates held in spaced parallel relation by bars, rotor sections mounted in said frame, cooperating stator sections each including a plurality of plates held in spaced parallel relation by outwardly channeled spacer straps, the bottom walls of the channels being indented upwardly to form solder pockets, insulation pieces secured to bars of the frame, metallic stator supports secured to said insulation pieces and projecting inwardly to points directly beneath the solder pockets, the union between the stator supports and the spacer straps being made by solder received in said solder pockets, thereby providing a strain free stator mounting.

4. A variable condenser comprising a frame including end and partition plates held in spaced parallel relation by solid round bars grooved to receive slots in the sides of the plates, and strips set edgewise into mating slots at the lower edges of the plates, rotor sections mounted in said frame, cooperating stator sections each including a plurality of plates held in spaced parallel relation by spacer straps, the bottom walls of the straps being indented upwardly to form solder pockets, insulation pieces secured to the frame strips and projecting upwardly therefrom, metallic stator supports secured to said insulation pieces and including support fingers projecting inwardly to points directly beneath the solder pockets, the union between the stator supports and the spacer straps being made by solder received in said solder pockets, thereby providing a strain free stator mounting.

5. A variable condenser comprising a frame, a rotor mounted therein, a stator including stator plates and outwardly channeled spacer straps holding the same in spaced parallel relation, a wall of said channels being indented upwardly to form solder pockets, metallic stator supporting fingers insulatedly mounted on said condenser frame and projecting inwardly to points beneath the solder pockets, the union between the supporting fingers and the spacer straps being made by solder received in said solder pockets, thereby providing a strain free stator mounting.

SAMUEL COHEN.